under 35 U.S.C. 154(b) by 457 days.

(12) United States Patent
Coatney et al.

(10) Patent No.: US 7,886,182 B1
(45) Date of Patent: Feb. 8, 2011

(54) ENHANCED COORDINATED CLUSTER RECOVERY

(75) Inventors: Susan M. Coatney, Cupertino, CA (US); Deepa Ramesh, Cupertino, CA (US)

(73) Assignee: Network Appliances, Inc., Sunnyvale, CA (US)

( * ) Notice: Subject to any disclaimer, the term of this patent is extended or adjusted under 35 U.S.C. 154(b) by 457 days.

(21) Appl. No.: 11/788,661

(22) Filed: Apr. 19, 2007

(51) Int. Cl.
*G06F 11/00* (2006.01)
(52) U.S. Cl. .................. 714/3; 714/4; 714/6; 714/11
(58) Field of Classification Search .................. 714/3, 714/4, 6, 11
See application file for complete search history.

(56) References Cited

U.S. PATENT DOCUMENTS

| | | | |
|---|---|---|---|
| 5,675,723 A | * | 10/1997 | Ekrot et al. ............ 714/4 |
| 5,812,751 A | * | 9/1998 | Ekrot et al. ............ 714/4 |
| 6,289,356 B1 | | 9/2001 | Hitz et al. |
| 6,496,942 B1 | * | 12/2002 | Schoenthal et al. ...... 714/4 |
| 7,111,194 B1 | | 9/2006 | Schoenthal et al. |
| 7,158,056 B2 | | 1/2007 | Wright et al. |
| 7,246,256 B2 | * | 7/2007 | De La Cruz et al. ..... 714/4 |
| 7,475,134 B2 | * | 1/2009 | Cook et al. ............ 709/224 |
| 7,546,302 B1 | | 6/2009 | Coatney et al. |

OTHER PUBLICATIONS

Watanabe, Steven S. et al., Pending Non-Published U.S. Appl. No. 10/767,640, filed Jan. 29, 2004, entitled "System and Method for Coordinated Bringup of a Storage Appliance in a Cluster Configuration".

* cited by examiner

*Primary Examiner*—Bryce P Bonzo
*Assistant Examiner*—Charles Ehne
(74) *Attorney, Agent, or Firm*—Blakely, Sokoloff, Taylor & Zafman LLP

(57) ABSTRACT

An apparatus and a method that prevent a split-brain problem by preventing a cluster partner from accessing and serving data when the cluster partner is taken over by a storage server, while allowing early release of reservations on the cluster partner's storage devices before control is given back to the cluster partner.

18 Claims, 9 Drawing Sheets

ENHANCED COORDINATED CLUSTER RECOVERY

TECHNICAL FIELD

This invention relates to the field of network data storage systems and, in particular, to coordinated cluster recovery in network data storage systems.

BACKGROUND

Various forms of network data storage systems are known today. These forms include network attached storage (NAS), storage area networks (SANs), and others. Network storage systems are commonly used for a variety of purposes, such as providing multiple users with access to shared data, backing up critical data (e.g., by data mirroring), etc.

A network storage system typically includes at least one storage server, which is a processing system configured to store and retrieve data on behalf of one or more client processing systems ("clients"). Some network storage systems may include two clustered storage servers, such as in a cluster failover system configuration. In accordance with failover methodologies, should a conventional storage server in a cluster failover system configuration fail, a partner storage server initiates a takeover of the volume(s) that are normally serviced by the failed storage server. A clustered system includes two or more nodes, with attached storage, and a cluster interconnect. When a taken-over storage server reboots, the cluster failover system typically has two fencing mechanisms that prevent this node from booting all the way up and trying to serve data. First, disk reservations can be placed on the storage devices associated with a failed storage server by the partner storage server to prevent access to the storage devices by the failed storage server. In particular, the takeover node places disk reservations on the storage devices by issuing a command to the storage devices. The disk reservations are configured to indicate ownership of data access control of the data on the storage devices. Second, takeover state information can be written to an on-disk area known to the clustering code in the storage devices associated with the clustered node(s). The on-disk area may be a disk containing the cluster information. This on-disk area that includes the clustering information and the takeover state information is referred herein as mailbox disks in storage server cluster applications. The contents of the mailbox disks tell the partner node that has failed that it has been taken over.

When the failed partner node reboots after being taken over, it first encounters disk reservations and goes to a waiting state, and waits for the partner node to give back control of the data. When the disk reservations are cleared, the failed partner node reads the contents of the clustering disk area (e.g., mailbox disks). From that data, the failed partner node determines that it is still taken over. However, there are situations where the failed partner node does not realize it has been taken over, and thus, incorrectly proceeds with booting and attempting to access and serve the same data as the partner node. This is referred to as a split-brain conflict. The split-brain conflict may cause data corruption due to both the storage servers taking ownership of the same data. Other problems that can result from the two clusters attempting to access and serve the same data are that it may cause the node that is the takeover node to fail and stop serving data, resulting in two failed nodes, or in a worst case scenario, data corruption may occur.

Conventionally, when the failed node reboots it sees the disk reservations and goes into the waiting state, waiting for the partner node to give back control until the reservations have cleared. If for some reason, such as early-release of the disk reservations or the failed node gets past this check incorrectly, the on-disk area that includes the clustering information and the takeover state information (e.g., mailbox disks) should still indicate that this node has been taken over and the node goes into a wait state, such as a mailbox wait state. However, the following conditions describe a situation where these two fencing mechanisms may not be adequate.

The first condition is when the failed node is booting up and goes into the waiting for giveback state, and the partner node, seeing that the failed node is in the waiting for giveback state, releases reservations on the failed node, allowing the failed node to further boot. This helps reduce the wait time for the process of giving back control to the failed node. The release of disk reservations before the node continues to boot is called early-release of disk reservations. The second condition is when the storage devices containing the cluster information are discovered late. Storage devices can be discovered late, due to storage devices being slow to spin-up and go online, or storage loops being offline or otherwise inaccessible. Sometimes the disk discovery mechanism has problems and not all the storage devices are discovered in the first pass of searching for the storage devices that contain the cluster information. If the storage devices containing the cluster information (e.g., mailbox disks) are not part of the first set of disks, the booting node attempts to find alternate on-disk area that may include out-dated clustering information and the takeover state information, which do not contain information that the node was taken over. Upon failure to find alternate on-disk areas that may include out-dated clustering information, the booting node may create new cluster state information, which does not contain information about the node being taken over.

The split-brain conflict, which includes both storage servers taking ownership of the same data, occurs when the two conditions described above occur, namely the disk reservations have already been released, and the on-disk area that includes the clustering information and the takeover state information (e.g., mailbox disks) are not found. These two scenarios cause the failed node to boot, leading to split-brain conflict, which can result in the node in takeover failing, which causes data to become unavailable, and potentially other problems.

SUMMARY OF INVENTION

Described herein are an apparatus and a method that prevent a split-brain problem by preventing a cluster partner from accessing and serving data when the cluster partner is taken over by a storage server, while allowing early release of reservations on the cluster partner's storage devices before control is given back to the cluster partner. When a split-brain conflict occurs, it can result in preventing either or both of the nodes from serving data, as well as, in a worst case situation, data corruption. By removing the possibility of having a split-brain conflict, it is now possible to release disk reservations early, prior to giving back control of the system resources to the rebooting node. The early release of disk reservations is advantageous as it may allow the rebooting node to get further into the boot process, thus speeding up giveback control processing and reducing the client outage time.

BRIEF DESCRIPTION OF THE DRAWINGS

The present invention is illustrated by way of example, and not by way of limitation, in the figures of the accompanying drawings.

DETAILED DESCRIPTION

Figure 1:
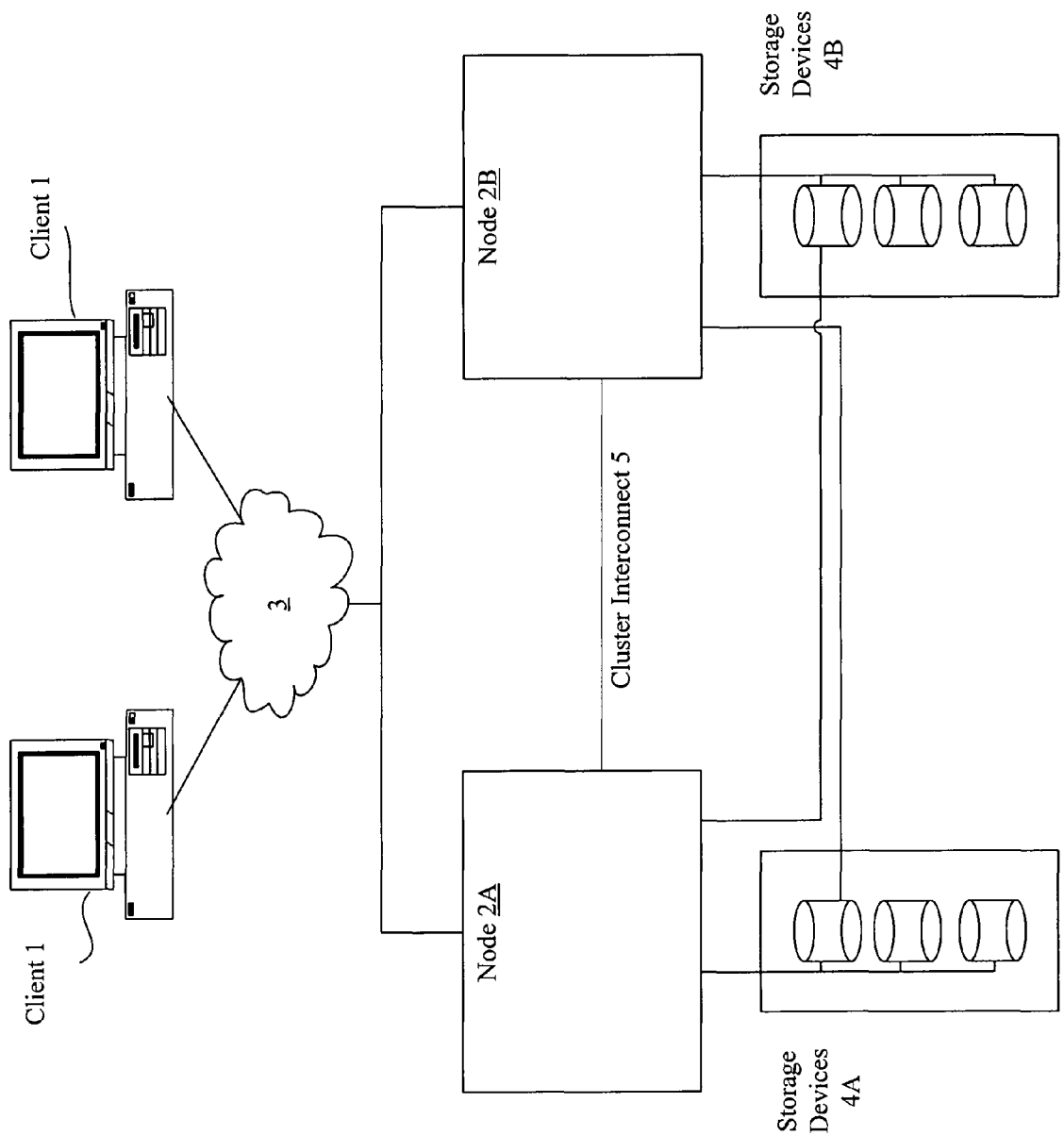
FIG. 1 illustrates a block diagram of one embodiment of an environment including a cluster configuration.

Described herein are apparatuses and methods for preventing a split-brain problem by preventing a cluster partner from accessing and serving data when the cluster partner is taken over by a storage server, while allowing early release of reservations on the cluster partner's storage devices before control is given back to the cluster partner. The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to facilitate understanding of the present invention. Thus, the specific details set forth are merely exemplary. Particular implementations may vary from these exemplary details and still be contemplated to be within the spirit and scope of the present invention.

OVERVIEW

Coordinated Cluster Recovery

As described above, when the disk reservations have already been released and the booting node does not find the storage devices containing the cluster state information (e.g., mailbox disks), the conventional servers in a storage server cluster can have a split-brain conflict, in which the conventional servers are accessing and serving the same data from the taken-over storage devices associated with the cluster partner when the cluster partner is taken over by the storage server. Described herein are embodiments directed to preventing the split-brain problem by preventing a cluster partner (i.e., a failed storage server) in the storage server cluster from accessing and serving data from taken-over storage devices associated with the cluster partner while allowing release of reservations on the taken-over storage devices associated with the cluster partner before control is given back to the cluster partner (e.g., early-release of disk reservations). When a split-brain conflict occurs, it can result in unnecessary system panics (e.g., node stops serving data), as well as, in a worst case situation, data corruption. By removing the possibility of having a split-brain conflict, it is now possible to release disk reservations early, prior to giving back control of the system resources to the rebooting node. The early release of disk reservations is advantageous as it may allow the rebooting node to get further into the boot process, thus speeding up giveback control processing and reducing the client outage time.

The embodiments described herein are configured to ensure that the rebooting node finds the storage devices containing cluster information on the storage devices, and to prevent the rebooting node (e.g., failed storage server) from completing boot-up before control has been given back to the rebooting node from the takeover node (e.g., takeover storage server).

The embodiments described herein provide an alternate way to perform coordinated cluster recovery. Using the embodiments described herein, when a node is in takeover state (e.g., has taken control of the data storage devices associated with the failed cluster node), the takeover node sends data (e.g., takeover state information) across the cluster interconnect to indicate that the takeover node is in a takeover state. The data indicates to the partner node that the partner node has been taken over and when the disk reservations are removed, the partner node should find the on-disk area that includes the clustering information and the takeover state information (e.g., mailbox disks) at a location where the takeover node has written cluster state information, and that the partner node should wait for the takeover node to giveback control (e.g., wait for the giveback process to complete) before continuing to boot.

The embodiments described herein can be implemented as a new state in the shared memory of the takeover storage server. A node is configured to transition to the takeover state from the normal state where the storage servers are both operational when initiating the takeover. The normal state is a non-takeover state that is also referred to as an UP state, which indicates the node is up and serving data to the attached clients. A node is UP when it is booted, running, and serving data to its clients without having taken over its partner. The takeover state of the takeover node is configured to be transmitted over the cluster interconnect and the status is configured to be updated at regular intervals to indicate progress of the takeover procedure and that it is up and serving data. When the taken-over node boots, the taken-over node checks the firmware state of its cluster partner. If the state of the cluster partner is in the takeover state, the taken-over node locates its cluster state disks (e.g., mailbox disks) and then waits until the firmware state of the cluster partner is the normal state before proceeding to the normal boot path. This allows early release of disk reservations, and also prevents the taken-over node from incorrectly deciding to use an alternate, or new, set of mailbox disks. In particular, as the taken-over node boots up, the taken-over node first encounters disk reservations and sends data to the cluster partner to indicate that the taken-over node is in the waiting for giveback state. The takeover node may then release disk reservations on the storage devices associated with the partner node, allowing the rebooting node to boot further. However, instead of booting all the way up, as done conventionally, the rebooting node now interprets the takeover state of the partner node to determine that the rebooting node has been taken over and waits for the partner state to go into the normal state to prevent the rebooting node from booting to a point that it attempts to serve data before control has been given back from the takeover node. While the rebooting node waits for this transition, the rebooting node also checks for on-disk area that includes the clustering information and the takeover state information (e.g., mailbox disks) at the existing timeout intervals. At this point, the rebooting node also updates its local firmware state to indicate that it is in the waiting for giveback state and to indicate progress on the booting process. Giveback is the process of returning resources to the node that originally owned the resources prior to the takeover event. When a giveback command is issued, or if there is an auto giveback process, the takeover node then proceeds to perform the giveback operations and updates the storage devices containing the cluster state information of the partner node to indicate the giveback operations have been completed. The contents of the storage devices containing the cluster state information may be updated to include the current state information and cluster information. The giveback operations may include operations such as terminating use of a connection between the takeover node and the storage devices associated with the taken-over node, terminating use of internet protocol (IP) addresses of the storage devices associated with the taken-over node, and flushing the non-volatile memory of the taken-over node. Alternatively, the giveback operations may include other operations known by those of ordinary skill in the art. As a final operation, the takeover node updates its local firmware state from the takeover state to the normal state. The rebooting node receives the updated state information from the takeover node over the cluster interconnect and proceeds to the current boot path. It should be noted that if the on-disk area that includes the clustering information and the takeover state information (e.g., mailbox disks) have still not been found by the rebooting node, the situation may be flagged by a message event. The rebooting node most likely will not be able to boot in this case because the storage devices containing the cluster information (e.g., mailbox disks) are in the root volume and not finding them after the giveback operations are completed is an indication of some other underlying storage problem. For example, the storage devices containing the cluster information (e.g., mailbox disks) might not be accessible due to disk or cabling issues as known to those of ordinary skill in the art. It should also be noted that if no progress is indicated on the takeover state, this may also indicate that something is wrong with the takeover node.

Storage Node Network Environment

FIG. 1 illustrates a block diagram of one embodiment of an environment including a cluster configuration. The cluster system configuration includes a pair of nodes 2A and 2B coupled by a dedicated cluster interconnect 5. In other embodiments, the nodes 2A and 2B could be coupled through a non-dedicated interconnect, such as through the network 3. In one embodiment, the nodes 2A and 2B may be storage servers in a storage server cluster. Alternatively, other types of nodes in cluster configurations may be used. The node 2A is coupled to storage devices 4A, which includes multiple storage devices (e.g., disks). The node 2B is coupled to storage devices 4B, which includes multiple storage devices (e.g., disks). The nodes 2A and 2B are also coupled through a network 3 to a number of clients 1 (hereinafter simply "clients"). The storage devices 4A and 4B are managed by the nodes 2A and 2B. The nodes 2A and 2B receive and respond to various read and write requests from the clients 1, relating to volumes, directories, LUNs, files, blocks and/or other units of data stored in (or to be stored in) the storage devices 4A and 4B. Either of the storage servers 2A and 2B may be a processing system that is configured to store and retrieve data on behalf of one or more client processing systems, such as the clients 1. In the context of NAS, the storage server may be a file server, which is sometimes called a "filer." In one embodiment, either or both of the storage servers 2A and 2B are storage servers, made by Network Appliance, Inc. of Sunnyvale, Calif. In a SAN context, the storage server provides clients with block-level access to stored data, rather than file-level access. Some storage servers are capable of providing clients with both file-level access and block-level access, such as certain storage servers made by Network Appliance, Inc. of Sunnyvale, Calif.

Each of the clients 1 may be, for example, a conventional personal computer (PC), workstation, or the like. The clients 1 may be general-purpose computers configured to execute software applications. Each client 1 may communicate with the nodes over the network 3 by exchanging data according to pre-defined protocols, such as Transmission Control Protocol/Internet Protocol (TCP/IP). Moreover, the client 1 may interact with the nodes in accordance with a client/server model of information delivery. That is, the client may request the services of the node, and the system may return the results of the services requested by the client, by exchanging data over the network 3. The clients 1 may issue commands and data using file-based access protocols, such as the Common Internet File System (CIFS) protocol or Network File System (NFS) protocol, over TCP/IP when accessing information in the form of files and directories. Alternatively, the client may issue commands and data using block-based access protocols, such as the Small Computer Systems Interface (SCSI) protocol encapsulated over TCP (iSCSI) and SCSI encapsulated over Fibre Channel Protocol (FCP), when accessing information in the form of blocks.

The nodes 2A and 2B may be, for example, a storage server used in a NAS mode (e.g., a "filer"), a block-based storage server such as used in a SAN, a storage server which can perform both file-level access and block-level access for clients, or another type of storage server. Alternatively, the nodes 2A and 2B may be other types of servers in cluster configurations. The network 3 may be, for example, a local area network (LAN), a metropolitan area network (MAN), a virtual private network (VPN), a wide area network (WAN), a global area network (GAN) such as the Internet, or other type of network or combination of networks. The network 3 may implement, for example, Ethernet protocol, FCP, or another protocol or a combination of protocols.

The storage devices 4A and 4B may store data represented in an active file system of the nodes 2A and 2B. The storage devices in the storage devices 4A and 4B may be, for example, conventional magnetic disks, optical disks such as CD-ROM or DVD based storage, magneto-optical (MO) storage, or any other type of non-volatile storage devices suitable for storing large quantities of data. The storage devices in the storage devices 4A and 4B can be organized as one or more RAID groups, in which case the nodes 2A and 2B access the storage devices 4A and 4B using an appropriate RAID protocol. A file system is a hierarchy of the stored data sets. A file system includes directories and files. A file system layer or manager is an application-level programmatic entity or layer which imposes the hierarchal structure on the data sets, such as the files, directories and/or other data containers stored and/or managed by a storage server, and which services read and write requests from clients of the storage server. A LUN may be a virtual partition of a RAID group. For example, a LUN may be formed as a "stripe" that is one or more blocks wide, across the storage devices in a RAID group, where a block may be, for example, a 4 Kbyte chunk of storage space. A LUN may appear to a client, for practical purposes, as a physical storage device such as a disk.

Storage of information is preferably implemented as one or more storage "volumes", each of which includes a set of one or more physical disks managed cooperatively to define an overall logical arrangement of disk space on the volume(s). A volume is a logical data set which is an abstraction of physical storage, combining one or more physical storage devices or parts thereof into a single logical storage object (e.g., data storage unit), and which is managed as a single administrative unit, such as single file system. Typically file systems have a one to one mapping to volumes where volumes can be constructed from one or more storage devices (e.g., disks). Typically, a volume management layer, which is separate from the file system layer, handles the arrangement of storage devices and provides the appearance that a single volume exists to the file system layer. Each volume is generally, although not necessarily, managed as a separate file system. Each volume stores a copy of a data set, and each node has its own data sets as well as has access to the other node's data sets. It should be understood that while only two nodes are shown in the illustrative cluster configuration, it is expressly contemplated that multiple nodes and volumes may be connected in a cluster configuration and provide takeover for each other.

Each node includes multiple data access ports that enable the system to connect to multiple storage loops. Each node includes port connectors that couple to the disks over an I/O interconnect arrangement. Each node is connected to both its volumes and the volumes of its "partner" node over the storage loops.

In accordance with failover methodologies, should a node in a cluster configuration fail, the partner node initiates a takeover of the volume(s) that are normally serviced by the failed node. Thus, for example, if node 2A should fail, then node 2B would take over the operations and service data access requests to those volumes normally serviced by node 2A. It should be noted that the network topology is exemplary only and that the principles of the present invention can be implemented using a variety of configurations. That is, it is expressly contemplated that alternate storage network topologies or node configurations may be utilized, e.g., via switches, using external RAID boxes, etc.

Figure 2:
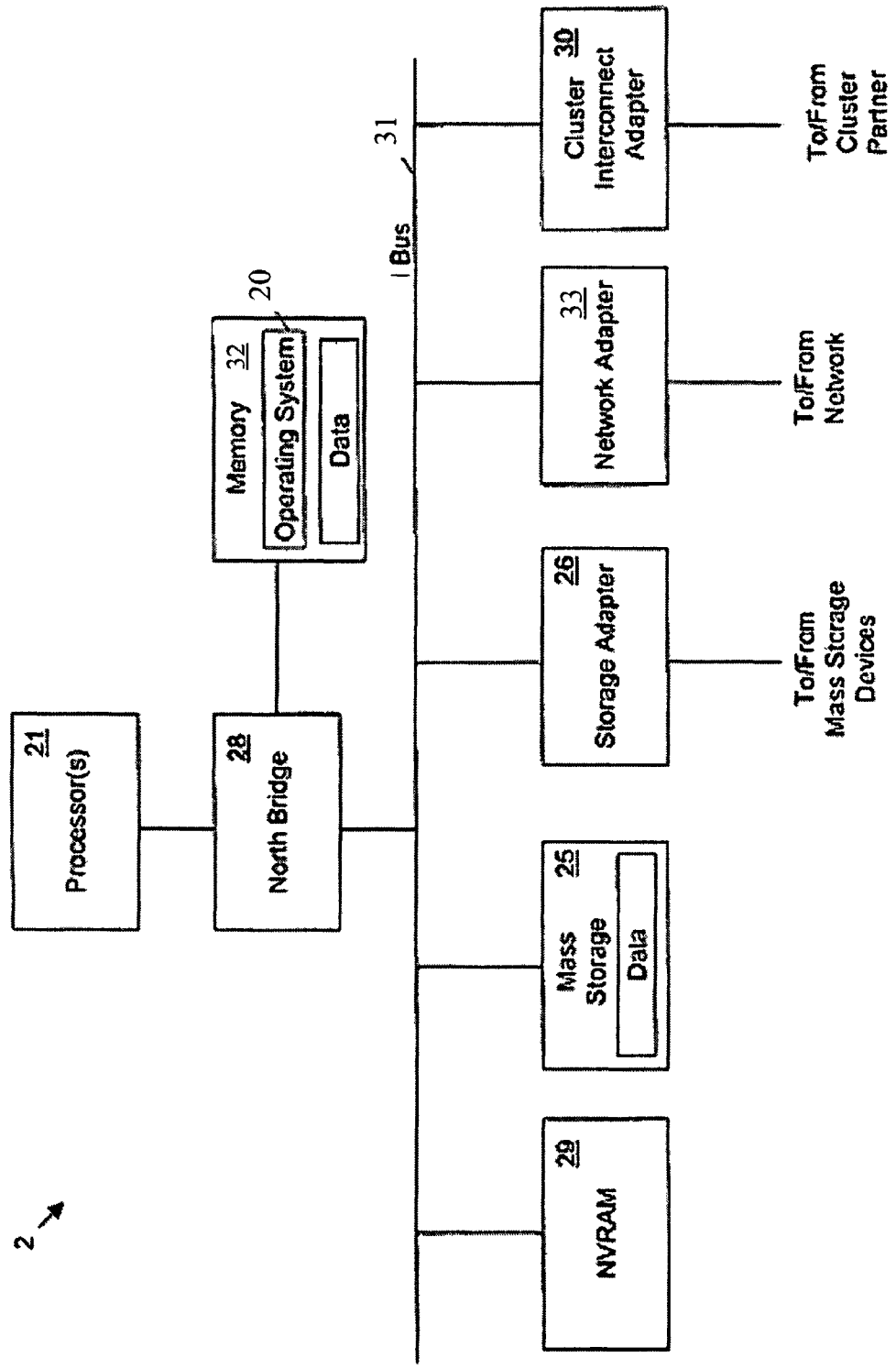
FIG. 2 illustrates a block diagram of one embodiment of the architecture of a storage server.

FIG. 2 illustrates a block diagram of one embodiment of the architecture of a storage server. The storage server of FIG. 2 can represent either the node 2A or node 2B. The storage server 2 includes one or more processors 21 and a system memory 32 coupled to each other by a north bridge 28. The north bridge 28 is also coupled to a bus 31 (e.g., Peripheral Component Interconnect (PCI) bus). The north bridge 28 provides an interface between peripheral components on the bus and the processors 21 and system memory 32.

Each processor 21 is a central processing unit (CPU) of the storage server 2 and, thus, controls the overall operation of the storage server 2. In certain embodiments, a processor 21 accomplishes this by executing software stored in system memory 32. Such software may include the operating system 20 of the storage server 2. Each processor 21 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices. The system memory 32 is a random access memory (RAM) which stores, among other things, the operating system 24 of the storage server 2, in which the techniques introduced herein can be implemented.

Connected to the bus 31 are a non-volatile memory 29 (e.g., NVRAM 29), which stores the non-volatile data of the storage server 2 (e.g., storage server and associated storage devices); one or more internal storage devices 25; a storage adapter 26; a network adapter 33; and a cluster interconnect adapter 30. The NVRAM 29 is configured to store information about the storage server and associated storage devices, such as, for example, a record of write requests received from clients since the last consistency point may be stored in NVRAM. It should be noted that NVRAM 29 may serve a special purpose in the operating system. The NVRAM 29 is tightly integrated into the write I/O data path so that modifications to the file system are logged into NVRAM 29 such that in the event of a power outage, the input/outputs (I/O) requests preserved in the NVRAM 29 can be replayed once the system is rebooted. In a cluster configuration, file system modifications are atomically logged both in the local node's NVRAM as well as the partner node's NVRAM so that when a failover occurs, the partner node can replay any I/O requests which may have been logged in the local nodes NVRAM before it went down.

Internal storage devices 25 may be or include any conventional medium for storing large volumes of data in a non-volatile manner, such as one or more disks. The storage adapter 26 allows the storage server 2 to access the external storage devices 4 and may be, for example, a Fibre Channel adapter, a SCSI adapter, or the like. The network adapter 33 provides the storage server 2 with the ability to communicate with remote devices such as the clients 1 over a network and may be, for example, an Ethernet adapter, or the like. The cluster interconnect adapter 30 provides the storage server 2 with the ability to communicate with its cluster partner. In certain known implementations, the cluster interconnect adapter 30 complies with the InfiniBand Architecture Specification, Release 1.1, Nov. 6, 2002, to communicate with the cluster partner, and more specifically, to communicate with the cluster partner using Remote Direct Memory Access (RDMA) or InfiniBand Send/Receive operations. It should be noted that the cluster interconnect adapter can also be implemented in the same physical components as the storage or network adapters 26 and 33.

Figure 3:
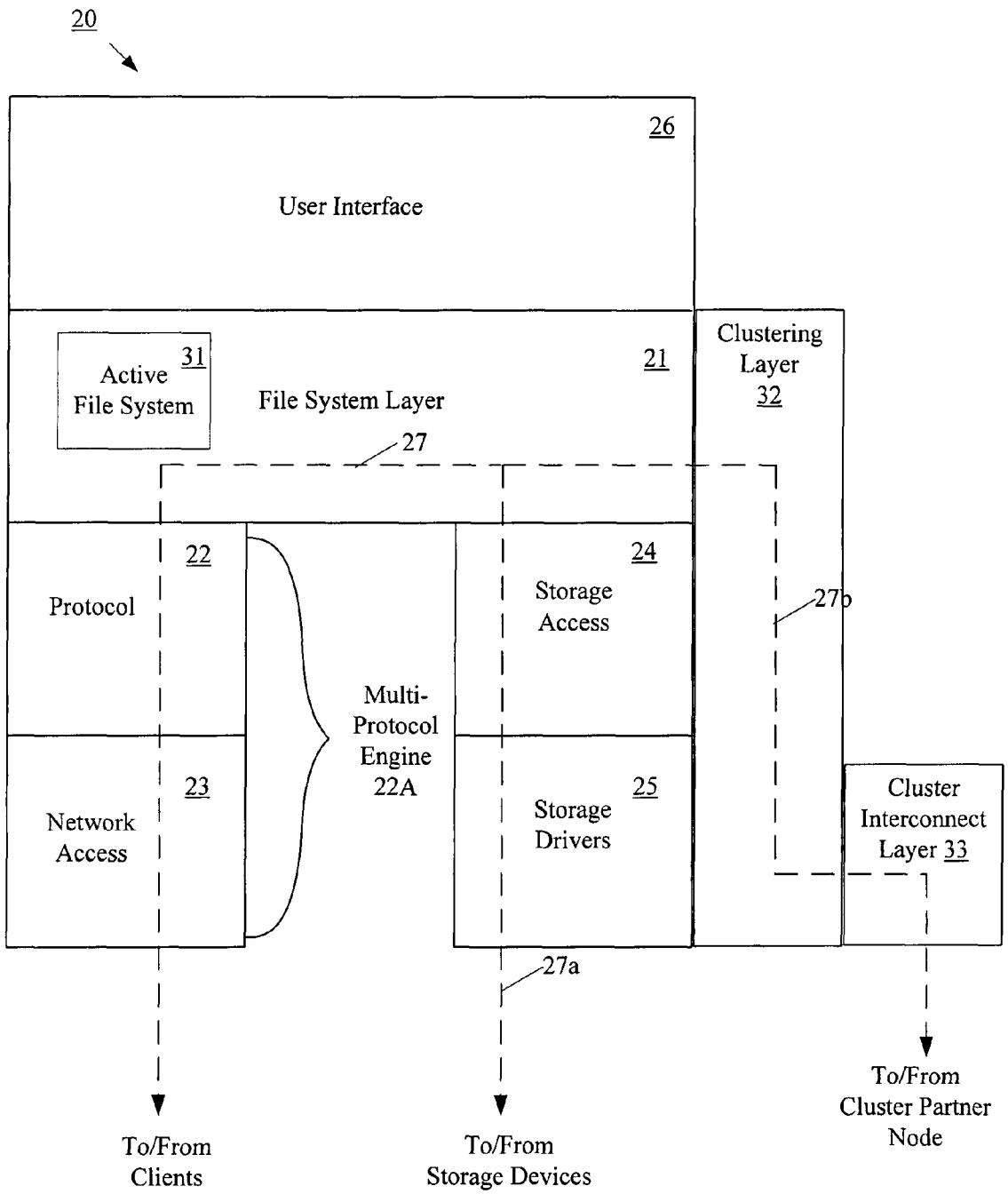
FIG. 3 illustrates one embodiment of the architecture of the operating system of the storage server of FIG. 2.

FIG. 3 shows one embodiment of the architecture of the operating system of the storage server 2. As shown, the operating system 20 includes several software modules, or "layers". These layers include a file system layer 21. The file system layer 21 is an application-level layer which imposes a structure, e.g. a hierarchy, on files and directories and/or other data containers stored by the storage server 2 and which services read/write requests from clients 1, among other functions. This hierarchy is referred to as the "active file system" 31. Logically "under" the file system layer 21, the operating system 20 also includes a protocol layer 22 and an associated network access layer 23 to allow the storage server 2 to communicate over the network 3 (e.g., with clients 1). The protocol layer 22 implements various higher-level network protocols, such as Network File System (NFS), Common Internet File System (CIFS), Hypertext Transfer Protocol (HTTP), Fibre Channel Protocol (FCP), Internet SCSI (iSCSI), and/or other Upper Layer Protocols (ULP). In addition, assuming the storage server 2 is configured to operate in a SAN, the protocol layer 22 can also include a SCSI target layer 28, to enable the storage server 2 to receive and respond to SCSI I/O operations (i.e., read and writes). For block level access, the protocol layer 22 may be split in half where the bottom half represents the transport protocols iSCSI and FCP, and the top half is the common SCI target layer. The network access layer 23 includes one or more drivers which implement one or more lower-level protocols to communicate over the network, such as Ethernet, or TCP/IP. The network access layer may include TCP/IP stack as well as the lower level data link layer which includes the physical interfaces like Ethernet, a host bus adapter (HBA) which may provide a Fibre Channel interface, or the network adapter 33. The protocol layer 22 and the network access layer 23 can be collectively referred to as a multi-protocol engine 22A. In one embodiment, the storage server is a Filer, made by Network Appliance, Inc. of Sunnyvale, Calif., that is multi-protocol capable because the Filer can provide data access simultaneously through all of the data access protocols (e.g., NFS, CIFS, iSCSI, FCP, or the like) available in the protocol layer 22. Alternatively, other types of servers may be used.

Also logically under the file system layer 21, the operating system 20 includes a storage access layer 24 and an associated storage driver layer 25, to allow the storage server 2 to communicate with the storage devices 4. The storage access layer 24 implements a higher-level disk storage protocol, such as an implementation of RAID, while the storage driver layer 25 implements a lower-level storage device access protocol, such as Fibre Channel Protocol (FCP) or small computer system interface (SCSI). Also shown in FIG. 3 is the path 27A of data flow, through the operating system 20, associated with read or write operations of the attached storage devices. Also, the operating system 20 includes a clustering layer 32 and a cluster interconnect layer 33. The clustering layer 32 is configured to handle the read and write operations to the cluster partner's storage devices. The cluster interconnect layer 33 is configured to allow the storage server 2 to directly communicate with the cluster partner. Also shown in FIG. 3 is the path 27B of data flow, through the operating system 20, associated with cluster partner's storage devices.

The operating system 20 also includes a user interface layer 26 logically on top of the file system layer 21. The user interface layer 26 may provide a command line interface (CLI) and/or a graphical user interface (GUI) to various storage server functions, to allow an administrator to manage the storage server 2.

The storage server 2 has an active file system 31, which is created and managed by the file system layer 21 of the operating system 20. In one embodiment, the file system is a WAFL® (Write Anywhere File Layout) file system, available from Network Appliance, Inc. of Sunnyvale, Calif., as described in U.S. Pat. No. 6,289,356, which is assigned to Network Appliance of Sunnyvale, Calif. Alternatively, other file systems may be used. The active file system 31 includes a volume which includes one or more LUNs. The active file system 31 is the user accessible interface to the volume. However, the appearance that multiple volumes reside under a single file system root is possible. In one embodiment, this type of view of multiple volumes residing under a single file system can be provided using Data ONTAP® software, available from Network Appliance, Inc. of Sunnyvale, Calif. For example, the common root path from which all volumes can be accessed can be indicated by /vol (e.g., /vol/vol0, /vol/volA, or /vol/volB). In another embodiment, another level of indirection can be provided which allows the creation of pools of storage, called aggregates. These aggregates are containers which can hold multiple volumes, otherwise known as flexible volumes, such as FlexVol® volumes, available from Network Appliance, Inc. of Sunnyvale, Calif. It will be recognized that each volume or LUN can contain different data from that in any other volume or LUN, although data contained in the volumes and LUNs can also be duplicated in other volumes or LUNs. Each volume represents a set of one or more physical storage devices, such as disks. A LUN is a data storage unit (e.g., a logical data container) that is exported to a client 1 and which, from the perspective of a client 1, appears to be a storage device, such as a disk. However, each LUN is actually stored as a file in the active file system 31 and is striped across multiple physical storage devices according to a RAID protocol. It should be noted that although nodes 2A and 2B are described and illustrated as a storage server in FIGS. 2 and 3, alternatively, other types of nodes in a cluster configuration may be used, such as client-based servers that are coupled to associated resources.

Coordinated Cluster Recovery

As described above, the embodiments described herein prevent a split-brain conflict between the nodes 2A and 2B, while allowing early release of the disk reservations before the takeover server (e.g., node 2B) gives back control to the rebooting server (e.g., node 2A).

Figure 4:
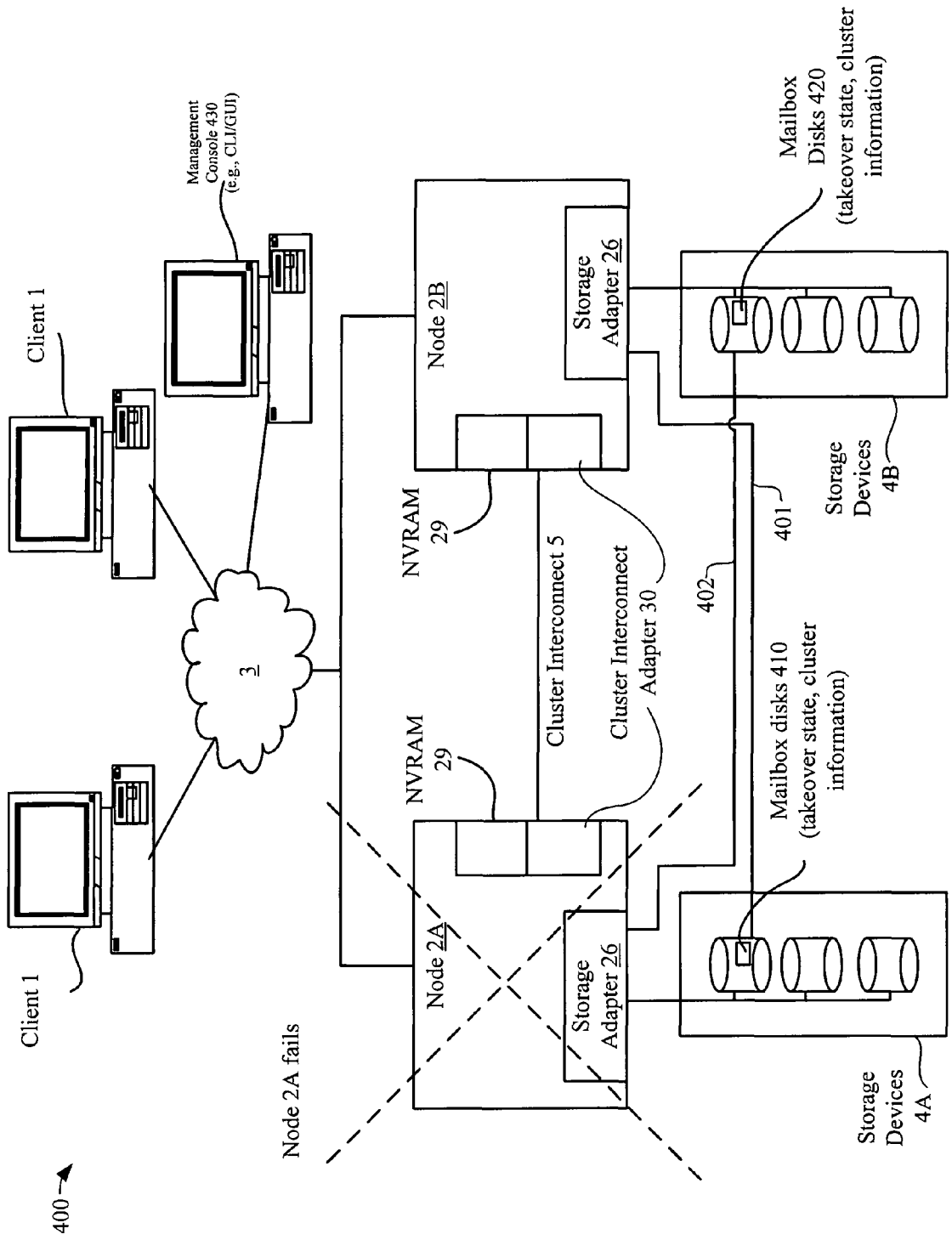
FIG. 4 illustrates a block diagram of one embodiment of a cluster configuration including two nodes coupled by a cluster interconnect.

FIG. 4 illustrates a block diagram of one embodiment of a cluster configuration including two nodes coupled by a cluster interconnect. The cluster configuration 400 includes similar components to those illustrated and described with respect to FIG. 1. However, the node 2A has failed in the cluster configuration, as indicated by the dashed lines. When the node 2A fails, the node 2B is configured to take over the node 2A and control access and serve data from the storage devices 4A on behalf of the node 2A. The node 2A is coupled to the storage devices 4A by the interconnect 401, and uses the interconnect 401 to share information with its partner node (e.g., node 2B and associated storage devices 4B). The interconnect 401 may be coupled to the storage adapter 26 of the node 2B, which is also coupled to the storage devices 4B associated with the node 2B. Alternatively, the node 2B includes a dedicated storage adapter that is configured to communicate with the storage devices 4A associated with the node 2A.

When the node 2B is in takeover state (e.g., node 2B has taken control of the data storage devices 4A associated with the failed node 2B), it sends data (e.g., takeover state information) across the cluster interconnect 5 to indicate that the node 2B is in a takeover state. The data received by the node 2A indicates that it has been taken over and when the disk reservations are removed, it should find mailbox disks 410 at a location where the node 2B has written the cluster state information, and that it should wait for the node 2B to giveback control (e.g., complete the giveback process) before continuing to boot. It should be noted that the mailbox disks 410 are an on-disk area that includes the clustering information and the takeover state information. Also, even though the embodiments are described and illustrated as having mailbox disks, in other cluster configurations, the on-disk area that includes the clustering information and the takeover state information may be located on the server itself or memory external to the server. The firmware of the node 2B includes a takeover state, and the node 2B is configured to transmit this state information on the cluster interconnect 5 regularly to let the node 2A know that the node 2A has been taken over by the node 2B. This state information may also be updated to indicate the status of the node 2B in the giveback process.

When the node 2A boots, the node 2A checks the firmware state of the node 2B, via information transmitted across the cluster interconnect. If the state of the node 2B is the takeover state, the node 2A locates its mailbox disks 410 and then waits until the firmware state of the node 2B is the normal state before proceeding to the normal boot path. As described above, this allows early release of disk reservations, and also prevents the node 2A from incorrectly deciding to use an alternate, or new, set of disks for the cluster state information. In particular, as the node 2A boots up, the node 2A first encounters disk reservations and sends data to the node 2B to indicate that the node 2A is in the waiting for giveback state. The node 2B may then release disk reservations on the storage devices 4A associated with the node 2A, allowing the node 2A to boot further. However, instead of booting all the way up, as done conventionally, the node 2A now interprets the takeover state of the node 2B to determine that the node 2A has been taken over by the node 2B and waits for the node 2B to go into the normal state before continuing to boot entirely. While the node 2A waits for this transition, the node 2A also checks for mailbox disks 410 at the existing timeout intervals. At this point the node 2A also updates its local firmware state to indicate that it is a waiting state (e.g., waiting for giveback state, and to indicate progress on the booting process. When a giveback command is issued by the node 2B, or if there is an auto giveback process, the node 2B then proceeds to perform the giveback operations and updates the mailbox disks 410 of the storage devices 4A to indicate the giveback operations have been completed. The contents of the mailbox disks 410 may be updated to include the current state information and cluster information. The giveback operations may include operations such as terminating use of a connection between the node 2B and the storage devices 4A associated with the node 2A, terminating use of the IP addresses of the storage devices 4A associated with the node 2A, and flushing the non-volatile memory (e.g., NVRAM 29) of the node 2A. Alternatively, the giveback operations may include other operations known by those of ordinary skill in the art.

As a final operation, the node 2B updates its local firmware state from the takeover state to the normal state. The node 2A receives the updated state information from the node 2B over the cluster interconnect 5 and proceeds to the current boot path. It should be noted that if the mailbox disks 410 have still not been found by the node 2A, the situation may be flagged by a message event. The node 2A most likely will not be able to boot in this case because the mailbox disks 410 are in the root volume and not finding them after the giveback operations are completed is an indication of some other underlying storage issue, such as storage issues due to inaccessible storage loops or missing or powered off disks. Also, it should also be noted that if no progress is indicated on the takeover state, this may indicate that something is wrong with the node 2B.

In another embodiment, instead of receiving the state information from the node 2B, the node 2A receives the state information, which indicates that the node 2A has been taken over by the node 2B, from a third node. The third node may be another node that is in (or in communication with) the cluster. In one embodiment, the third node may be a storage server. In another embodiment, the third node can be the management console 430 (e.g., CLI or GUI). Alternatively, the third node may be any of various other types of nodes known to those of ordinary skill in the art.

It should be noted that the cluster configuration 400, in addition to the fencing mechanism of notifying the node 2A that it has been taken over, also includes additional fencing mechanisms that prevent this node from booting all the way up and trying to serve data. In particular, one fencing mechanism includes the node 2B placing disk reservations on the storage devices 4A to prevent access to the storage devices by the node 2A. In particular, the node 2B places disk reservations on the storage devices 4A by issuing a command to the storage devices 4A. The disk reservations are configured to indicate ownership of data access control by the node 2B. In one embodiment, the disk reservations are SCSI disk reservations. Alternatively, other types of disk reservations may be used. Another fencing mechanism includes writing content in the mailbox disks 410 by the node 2B to indicate to the node 2A that it has been taken over. The mailbox disks 410 may also include additional information, such as the takeover state, cluster information, or the like.

It should be noted that although embodiments of FIG. 4 are described as the node 2A failing, similarly, the node 2A can takeover control of the storage devices 4B of the node 2B by way of the interconnect 402. The mailbox disk 420 of the storage devices 4B may be used to store state and cluster information when the node 2A has taken over the node 2B. It should also be noted that the embodiments of FIG. 4 may be implemented as two or more storage servers in a storage server cluster.

Figure 5:
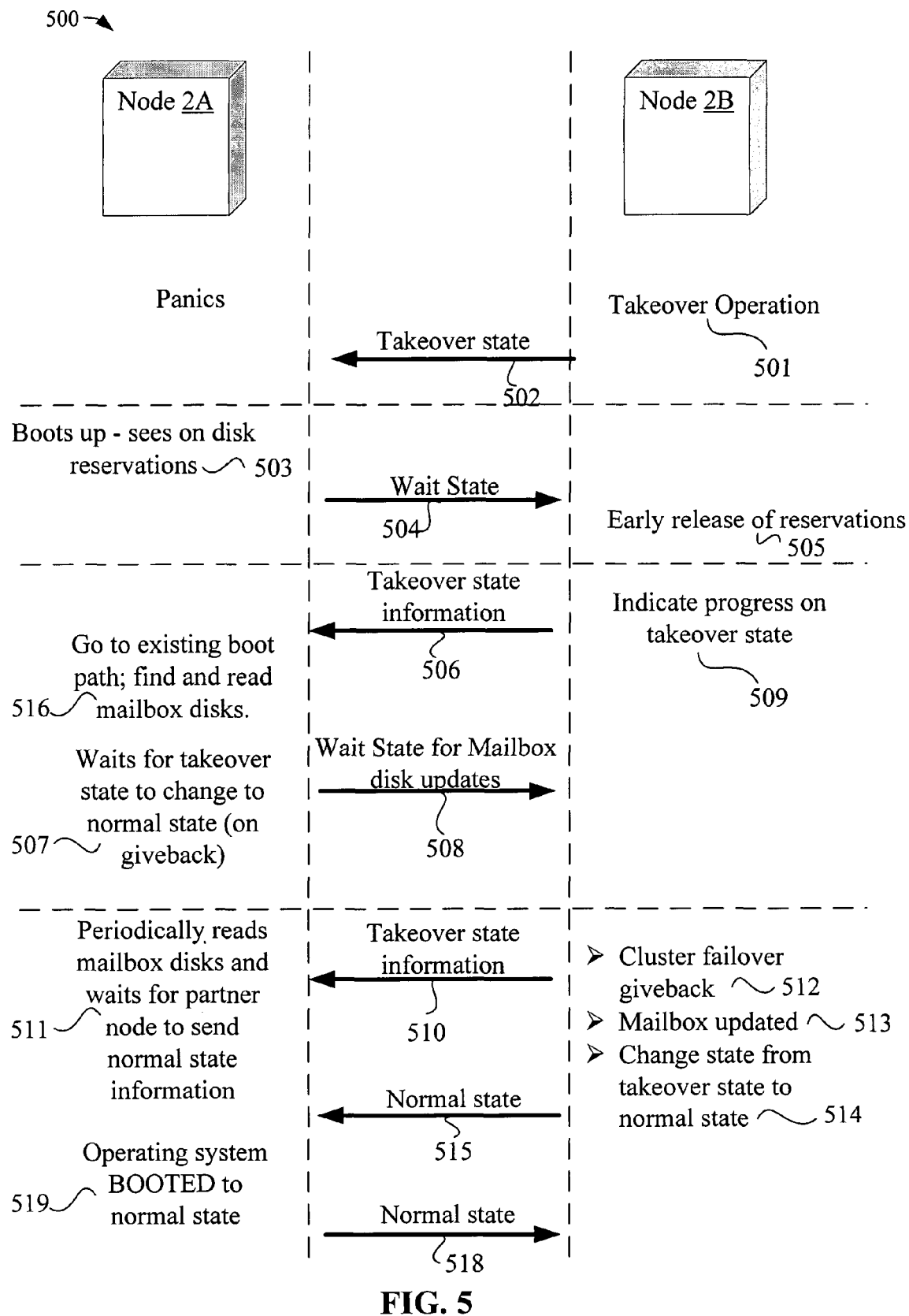
FIG. 5 illustrates one embodiment of a cluster configuration, including two nodes, in a takeover procedure.

FIG. 5 illustrates one embodiment of a cluster configuration, including two nodes 2A and 2B, in a takeover procedure. In takeover procedure 500, the node 2A fails or panics and the node 2B initiates a takeover operation of the node 2A, operation 501. As part of the takeover operation, the node 2B sends the takeover state information 502 to the node 2A to indicate that the node 2B is in takeover. In one embodiment, sending the takeover state information 502 includes sending a state signal representative of the takeover state of the node 2B. Alternatively, a command may be sent that includes the takeover state information. Upon booting, the node 2A sees the disk reservations on a storage devices 4A, operation 503. In response to the takeover state information 502, and upon seeing the disk reservations on the storage devices 4A, the node 2A sends wait state information to indicate that the node 2A is in a wait state 504, waiting for the node 2B to giveback control to the node 2A. In one embodiment, sending the wait state information 504 includes sending a state signal, representative of the wait state of the node 2A to the node 2B. Alternatively, a command may be sent to the node 2B that includes the wait state information 504.

Upon receiving the wait state information 504 from the node 2A, the node 2B releases the disk reservations on the storage devices 4A, operation 505. The release of reservations may be considered an early-release of reservations, because the disk reservations are released before control has been given back to the node 2A. It should be noted that the node 2B may be configured to periodically send the takeover state information to the node 2A, such as the takeover state information 506 and 510. After the disk reservations have been released by the node 2B, the node 2A boots further, finds the storage devices containing the cluster state information (e.g., mailbox disks 410), and reads the contents of the storage devices containing the cluster state information (e.g., mailbox disks 410), operation 516. While in the node 2A continues to boot, the node 2A may send updated state information to indicate the status of the boot process of the node 2A. The node 2B can also indicate progress 509 in the takeover state information 506 and 510. The node 2A waits for this node 2B to change its state from the takeover state to the normal state, operation 507, and waits for the node 2B to giveback control to the node 2A. Also, after the disk reservations have been released by the node 2B, the node 2A sends additional wait state information 508 to indicate that the node 2A is waiting for the information of the mailbox disks 410 to be updated. The contents of the mailbox disks 410 may be updated to include the current state information and cluster information. In one embodiment, sending the additional wait state information 508 includes sending to the node 2B a wait state signal representative of the wait state of the node 2A. Alternatively, a command may be sent that includes the wait state information 508. After the node 2A sends the additional wait state information 508 the node 2A periodically reads the storage devices containing the cluster state information (e.g., mailbox disks 410) and waits for the partner node to change its state from the takeover state to the normal state, for example, by receiving the normal state signal, operation 511.

Upon receiving the additional wait state information 508 from the node 2A, the node 2B starts the giveback procedure that gives the node 2A control of the data on the storage devices 4A. The giveback procedure may include various operations, such as performing cluster failover giveback operations, operation 512, updating the mailbox disks 410, operation 513, and changing the state of the node 2B from the takeover state to the normal state, operation 514. The cluster failover giveback operations may include operations such as terminating use of a connection between the node 2B and the storage devices 4A associated with the node 2A, terminating use of the IP addresses of the storage devices 4A associated with the node 2A, and flushing the non-volatile memory (e.g., NVRAM 29) of the node 2A. Alternatively, the cluster failover giveback operations may include other operations known by those of ordinary skill in the art.

Once the node 2B has completed the giveback procedure, including operations such as operation 512-514, the node 2B sends the updated state information that indicates that the node 2B is in the normal state 515. In one embodiment, sending updated state information includes sending a state signal representative of the normal state to the node 2A to the node 2A. Alternatively, a command may be sent that includes the normal state information. The normal state 515 indicates to the node 2A at the node 2B has given back control of the data on the storage devices 4A.

Once the node 2A has received the normal state information 515, the node 2A continues with the present boot path. Also, once the node 2A has booted its operating system completely, the node 2A changes its state to the normal state 519 to indicate that the node 2A is up and operational, accessing and serving data from the storage devices 4A, and is no longer taken over by the node 2B. Once the operating system has been completely booted, the node 2A notifies its partner node that it is in the normal state, for example, by sending the normal state signal 518.

Figure 6:
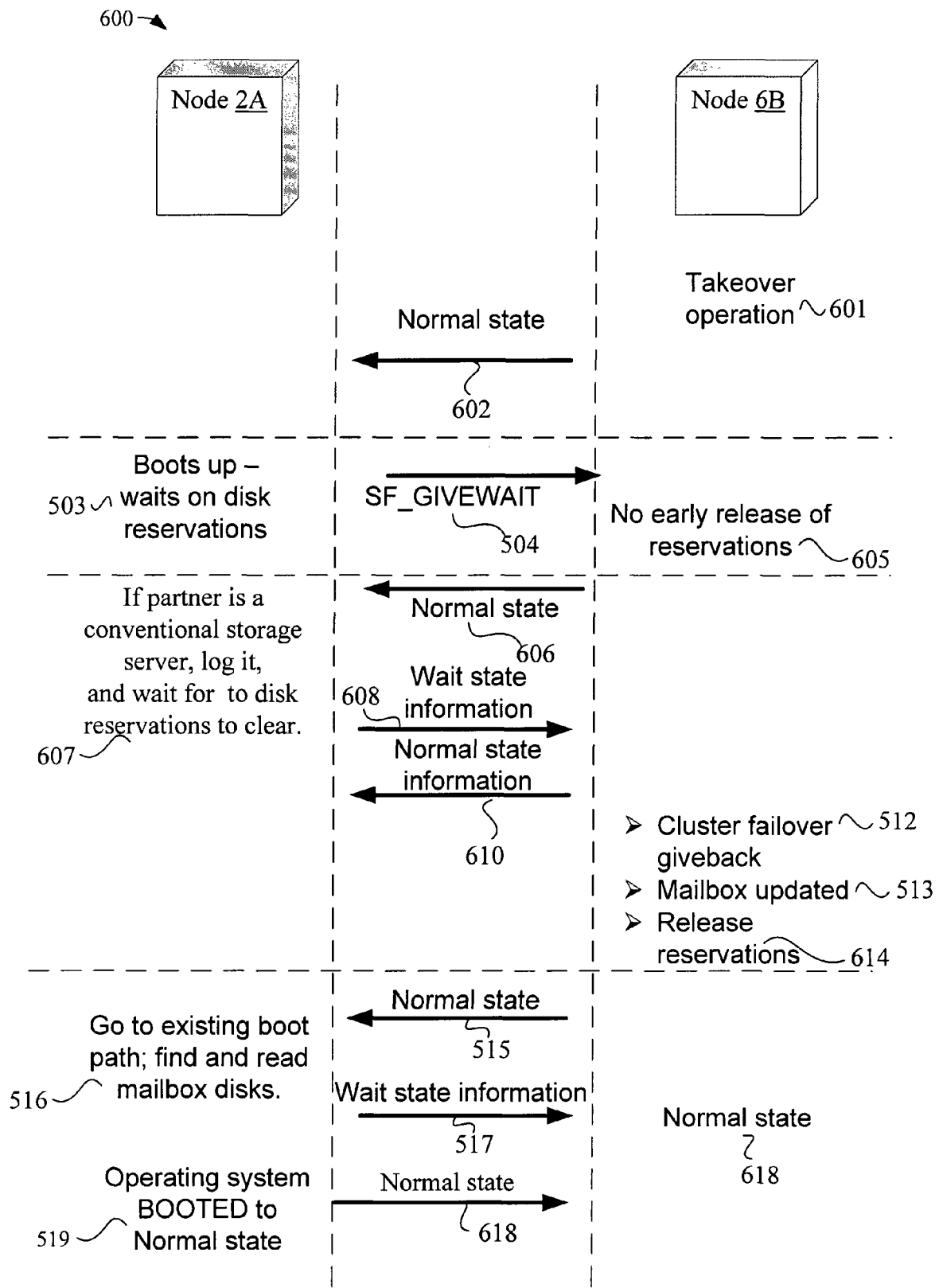
FIG. 6 illustrates another embodiment of a cluster configuration, including two nodes, in a takeover procedure.
Figure 7:
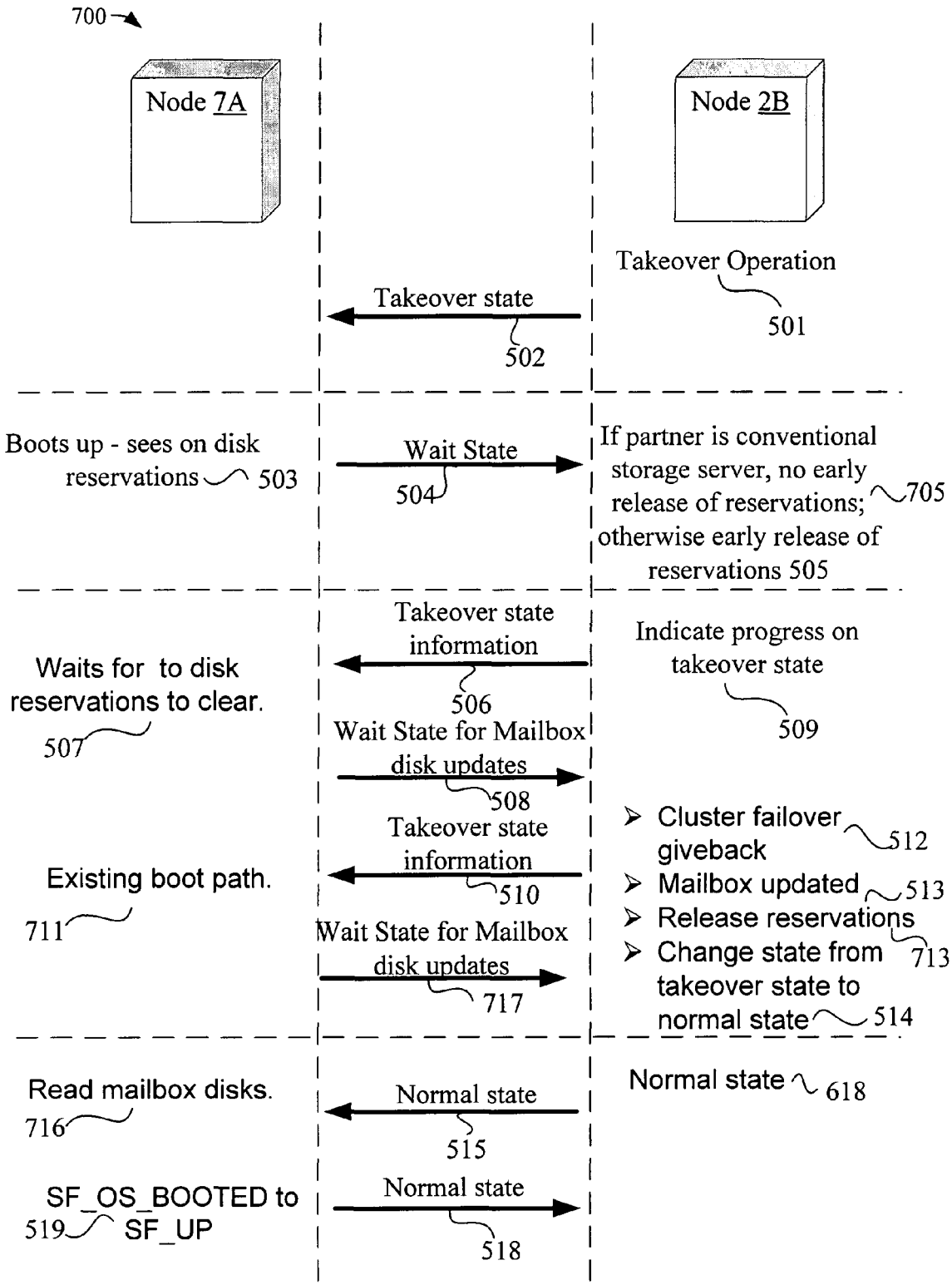
FIG. 7 illustrates another embodiment of a cluster configuration, including two nodes, in a takeover procedure.

It should be noted that the embodiments described with respect to FIG. 5 assume that each of the nodes are configured to communicate the state information, such as the takeover state, and respond accordingly. The embodiments of FIGS. 6 and 7 illustrate and describe embodiments where only one of the nodes implements the embodiments described herein. It should also be noted that the embodiments of FIGS. 5, 6, and 7 may be implemented as two storage servers in a storage server cluster.

FIG. 6 illustrates another embodiment of a cluster configuration, including two nodes 2A and 6B, in a takeover procedure. In this embodiment, the node 6B is a conventional storage server, and the node 2A is similar to the embodiments described above with respect to FIG. 5. There are some similarities between the takeover procedure 600 and the takeover procedure 500 of FIG. 5, as indicated by similar reference numbers. In the takeover procedure 600, the node 2A fails or panics and the node 6B initiates a takeover operation of the node 2A, operation 601. Since the node 6B is a conventional storage server, the node 6B sends the normal state information 602 to the node 2A as part of the takeover operation, instead of the takeover state information 502, as done in the embodiments of FIG. 5. It should be noted that although the node 6B sends the normal state information 602 to the node 2A on the interconnect 5, the node 6B does not send takeover state information (e.g., 502) as done by the node 2B described in FIG. 5. Upon booting, the node 2A sees the disk reservations on a storage devices 4A, operation 503. In response to the normal state information 602, and upon seeing the disk reservations on the storage devices 4A, the node 2A sends wait state information to indicate that the node 2A is in a wait state 504, waiting for the node 6B to giveback control to the node 2A. Since the node 6B is a conventional storage server, there is no early release of reservations, operation 605. It should be noted that the node 6B can be configured to periodically send the normal state information, such as the normal state information 606 and 610. The node 2A determines that the node 6B is a conventional storage server (e.g., old version of firmware than the node 2B that does not incorporate the embodiments described herein) that does not have the takeover state, and logs the receipt of the normal state information 606 and 610, and waits for the disk reservations to clear, operation 607. The node 2A may also be configured to periodically send the wait state information 608, waiting for the node 6B to giveback control to the node 2A.

Upon receiving the wait state information 608 from the node 2A, the node 6B starts to giveback procedure, which gives the node 2A control of the data on the storage devices 4A. The giveback procedure may include various operations, such as performing cluster failover giveback, operation 512, updating the mailbox disks 410, operation 513, and in this embodiment, the disk reservations on the storage devices 4A, operation 614, instead of changing the state of the node 6B as done in operation 514 of FIG. 5. Once the node 6B has completed the giveback procedure, including operations such as operation 512, 513, and 614, the node 6B sends the updated state information that indicates that the node 6B is in the normal state 515.

Once the node 2A has booted its operating system completely, the node 2A changes its state to the normal state 618 to indicate that the node 2A is up and operation, accessing and serving data from the storage devices 4A, and is no longer taken over by the node 2B. It subsequently sends the updated state information 618 to its partner node to indicate the node has completed booting. Once the node 6B has received the updated state information 517, the node 6B is completed with the takeover procedure, has given back control to the data of the storage devices 4A to the node 2A, and is in the normal state, operation 618. Also, once the node 2A has booted its operating system completely, the node 2A changes its state to the normal state 519 to indicate that the node 2A is up and operational, accessing and serving data from the storage devices 4A, and is no longer taken over by the node 2B. Once the operating system has been completely booted, the node 2A notifies its partner node that it is in the normal state, for example, by sending the normal state signal 518.

FIG. 7 illustrates another embodiment of a cluster configuration, including two nodes 7A and 2B, in a takeover procedure. In this embodiment, the node 7A is a conventional storage server, and the node 2B is similar to the embodiments described above with respect to FIG. 5. There are some similarities between the takeover procedure 700 and the takeover procedure 500 of FIG. 5, as indicated by similar reference numbers. In particular, in the takeover procedure 700, the node 2B determines if the node 7A is a conventional storage server (e.g., old version of firmware than the node 2B that does not incorporate the embodiments described herein), operation 705. If the node 7A is a conventional storage server, there is no early release of the disk reservations, however, if the node 7A is not a conventional storage server (e.g., includes the same version or newer version of firmware than the node 2B), then the node 2B releases the disk reservations early (e.g., by issuing a command to the storage devices 4A to release the disk reservations) as done in operation 505 of FIG. 5, operation 705. If there is no early release of the disk reservations in operation 705, the release of disk reservations is performed in operation 713, as part of the giveback procedure, which also includes the operations of cluster failover giveback, operation 512, updating the mailbox disks 410, operation 513, and changing the state of the node 2B from the takeover state to the normal state, operation 514. Once the node 2B has completed the giveback procedure, including operations such as operation 512-514, the node 2B sends the updated state information that indicates that the node 2B is in the normal state 515.

Also, the takeover procedure 700 differs from the takeover procedure 500 in that, once the node 7A receives the takeover state information 510 from the node 2B, the node 7A continues with the present boot path, operation 711, and sends the additional wait state information 717 to indicate that the node 7A is waiting for the information of the mailbox disks 410 to be updated. Once the node 7A has received the normal state information 515, the node 7A reads the mailbox disks 410, operation 716, and the node 7A changes its state to the normal state 519 to indicate that the node 7A is up and operation, accessing and serving data from the storage devices 4A, and is no longer taken over by the node 2B.

Figure 8A:
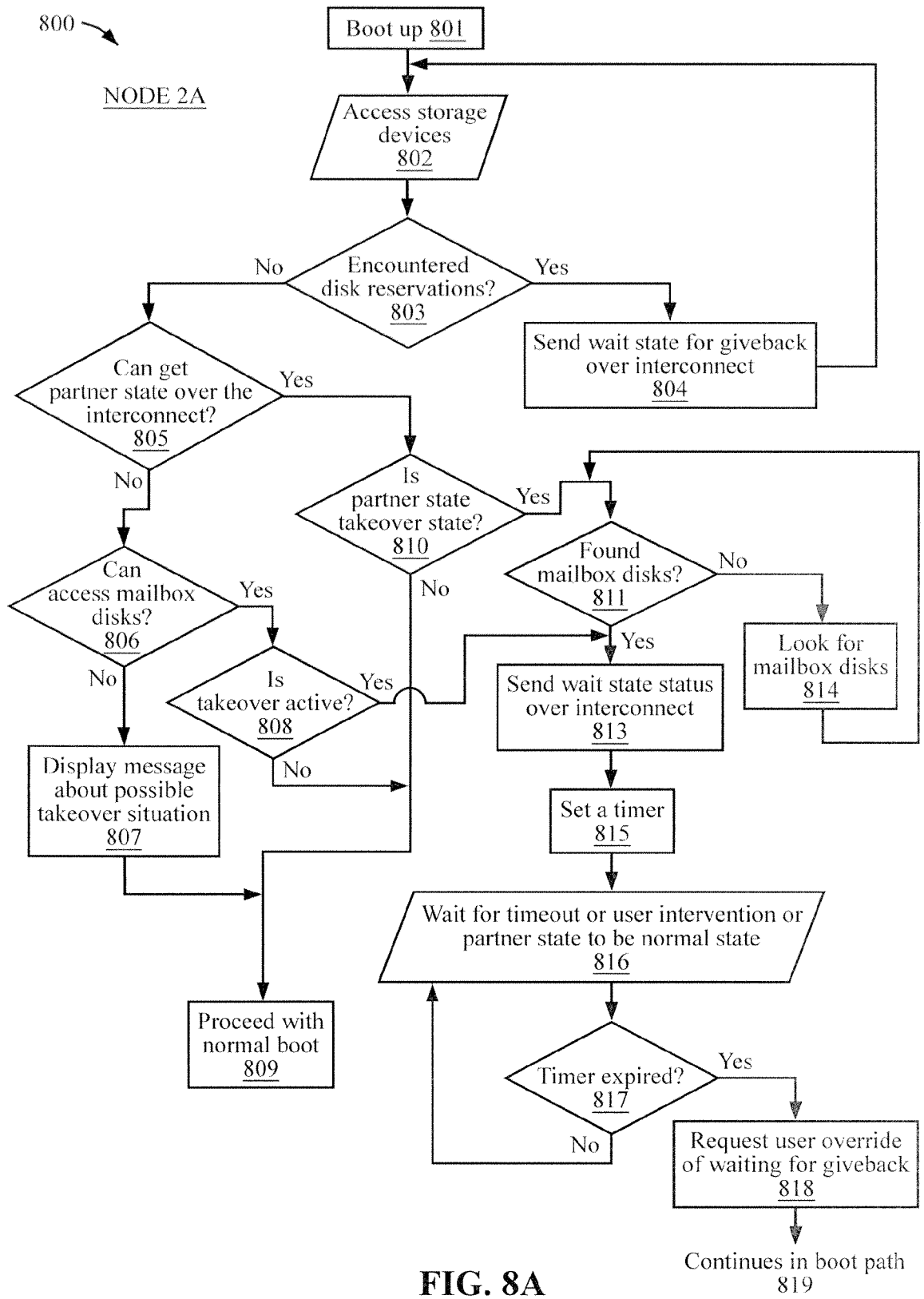
FIG. 8A illustrates a flow chart of one embodiment of a method for operating a taken-over node in a cluster configuration.

FIG. 8A illustrates a flow chart of one embodiment of a method 800 for operating a taken-over node 2A in a cluster configuration. In method 800, the node 2A initializes its boot process, operation 801. The node 2A may be booting in either a reboot context or a failover context. The node 2A accesses the storage devices 4A, operation 802. The node 2A determines whether disk reservations are encountered on the storage devices 4A, operation 803. If the node 2A determines that there is disk reservations on the storage devices 4A, the node 2A sends wait state information to the node 2B over the cluster interconnect 5 to indicate that the node 2A is waiting for giveback, operation 804, and the node 2A returns to accessing storage devices 4A in operation 802. However, if the node 2A does not encounter disk reservations in operation 803, the node 2A determines whether it can receive the state of the node 2B over the cluster interconnect 5, operation 805. If the node 2A cannot receive the state information of the node 2B in operation 805, the node 2A determines whether it can access the mailbox disks 410 on the storage devices 4A, operation 806. If the node 2A for cannot access the mailbox disks 410 in operation 806, the node 2A may display a message about the possible takeover situation, operation 807, and proceeds with the normal boot path, operation 809. However, if the node 2A can access the mailbox disks 410 in operation 806, the node 2A determines if takeover is active, operation 808. If the takeover is not active than the node 2A proceeds with the normal boot path in operation 809. However, if the takeover is active in operation 808, the node 2A sends wait state information to the node 2B over the cluster interconnect 5 to indicate that the node 2A is waiting for the contents of the mailbox disks 410 to be updated by the node 2B, operation 813.

If the node 2A can receive the state information from the node 2B over the cluster interconnect 5 in operation 805, the node 2A then determines if the node 2B is in the takeover state, operation 810. If the node 2B is not in the takeover state, then the node 2A proceeds with the normal boot path in operation 809. However, if the node 2B is in takeover state in operation 810, then the node 2A looks for the mailbox disks 410, and determines whether the mailbox disks 410 have been found, operation 811. If the node 2A does not find the mailbox disks 410 the node 2A continues to look for the mailbox disks 410 in operation 814, returning to operation 811. However, if the node 2A finds the mailbox disks 410 in operation 811, then the node 2A sends the wait state information to the node 2B over the cluster interconnect 5 in operation 813 to indicate that the node 2A is waiting for giveback of control, and a timer is set, operation 815. The node 2A waits for a timeout or user intervention or the partner state going to the normal state, operation 816. The node 2A determines if the timer has expired, operation 817. If the timer has not expired in operation 817, the node 2A goes back to waiting for the timeout or user intervention of operation 816. However, if the timer has expired in operation 817, the node 2A requests that the user override the wait state (e.g., waiting for giveback state) of the node 2A, operation 818, and continues in the present boot path, operation 819.

In another embodiment, the method 800 of operating the node 2A in a cluster configuration is configured to initialize a boot process of the node 2A in a failover or reboot context, and to receive at the node 2A data to indicate that the node 2A is in a taken-over state to prevent the node 2A from booting to a point of the boot process at which the node 2A serves data from the storage devices 4A taken over by the node 2B. In one embodiment, the received data that indicates that the node 2A is in the taken-over state is received from the node 2B. In another embodiment, the received data that indicates that the node 2A is in the taken-over state is received from a third node (e.g., a node external to the nodes 2A and 2B), such as an additional storage server in the cluster configuration, an additional storage server that is not in the cluster configuration, the management console 430 (e.g., CLI/GUI), or the like.

In another embodiment, the method 800 further includes receiving data from the node 2A to indicate that the node 2A is in a first wait state, and has partially booted, waiting for the node 2B to giveback control of the storage devices 4A. The method 800 may further include releasing reservations on the storage devices 4A when the node 2B receives the data that the node 2A is in the first wait state. The reservations may be configured to prevent the node 2A from accessing the storage devices 4A.

In another embodiment, the method 800 further includes receiving data from the node 2A to indicate that the node 2A is in a second wait state, waiting for the contents of the mailbox disks 410 to be updated, for example, by receiving a signal representative of the second wait state to the node 2B. When the node 2A is in the second wait state, the node 2A looks for and finds the mailbox disks 410 of the storage devices 4A, and waits for the node 2B to update the mailbox disks 410. The mailbox disks 410 are configured to store takeover state information and cluster information. The node 2A can also be waiting for the node 2B to perform the giveback operations while in the second wait state.

In another embodiment, the method 800 includes sending data to the node 2A to indicate that the node 2B is in a non-takeover state to allow the node 2A to continue booting to the point that the node 2A serves data from the storage devices 4A, for example, by sending a signal representative of the non-takeover state (e.g., sending normal state signal). When the node 2B is in the non-takeover state, the node 2B gives back control of the storage devices 4A to the node 2A. This may include, for example, performing the giveback operations, and updating the mailbox disks 410 of the storage devices 4A, prior to the sending the state information that indicates that the node 2B is in the non-takeover state. Updating the mailbox disks 410 may include updating the takeover state information and cluster information in the mailbox disks 410.

In one embodiment, the method 800 includes storing the data that indicates that the node 2A has been taken over by the node 2B in a non-volatile memory that is read by the node 2A when booting in the reboot context or the failover context. Alternatively, the data may be periodically sent from the node 2B, or the external node, such as the management console 430 or a third storage server.

Figure 8B:
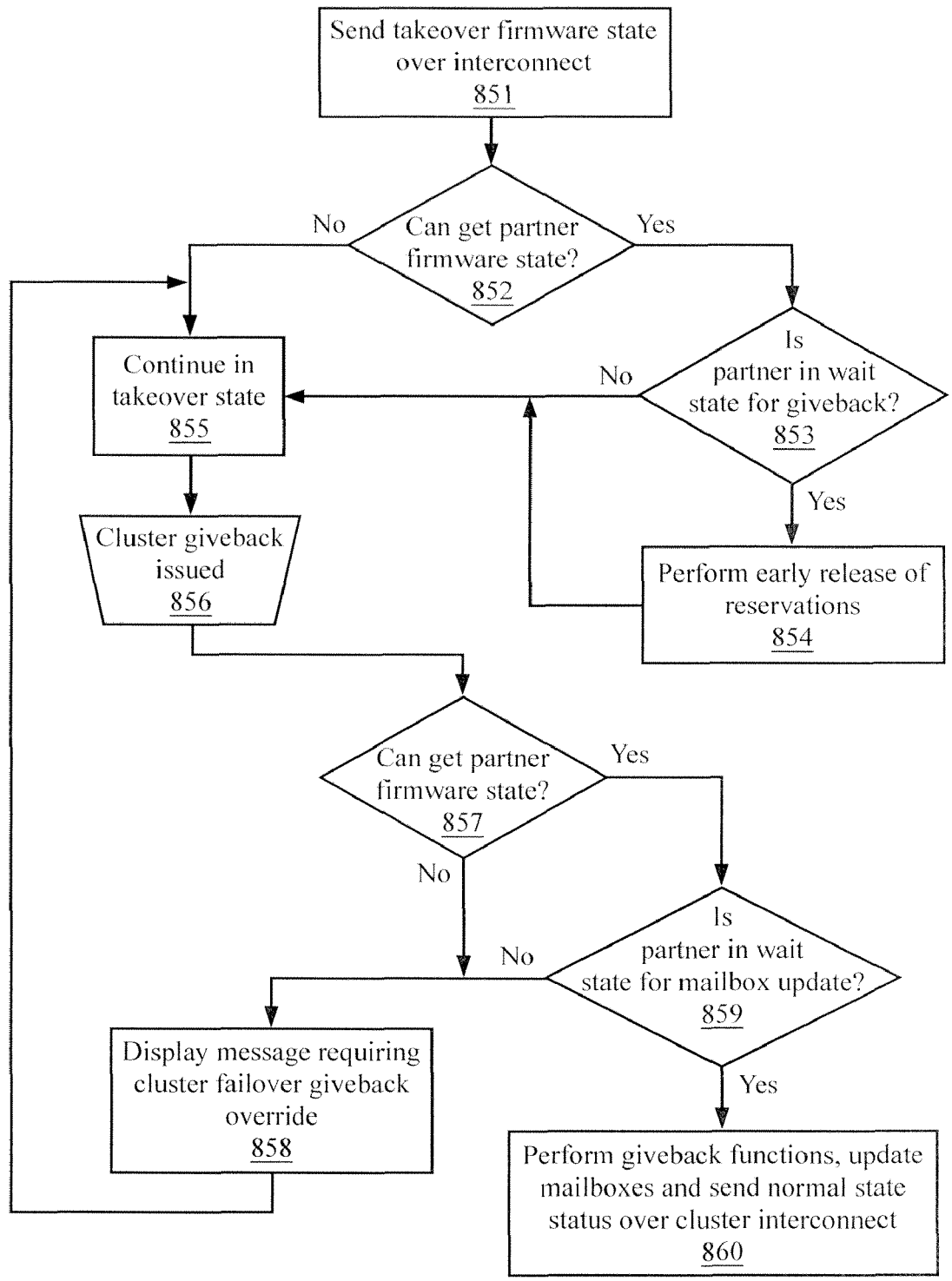
FIG. 8B illustrates a flow chart of one embodiment of a method for operating a takeover node in a cluster configuration.

FIG. 8B illustrates a flow chart of one embodiment of a method 850 for operating a takeover node 2B in a cluster configuration. In method 850, the node 2B sends its takeover state information over the cluster interconnect 5 to the node 2A, operation 851. The node 2B is configured to transmit this state information on the cluster interconnect 5 regularly to let the node 2A know that the node 2A has been taken over by the node 2B. The node 2B may be in takeover as a result of the node 2A booting in either a reboot context or a failover context. The node 2B determines whether it can receive state information from the node 2A, operation 852. If the first is configured to receive the state information from the node 2A in operation 852, the node 2B determines if the node 2A is in a first wait state, waiting for the node 2B to giveback control of the data on the storage devices 4A (e.g., waiting for giveback), operation 853. If the node 2A is in the first wait state, the node 2B performs early release of the disk reservations 410, operations 854, and continues in the takeover state, operation 855. However, if the node 2A is not in the first wait state, then the node 2B merely continues in a takeover state in operation 855, without performing early release of the disk reservations 410. Similarly, if the node 2B cannot receive this state information of the node 2A in operation 852, the node 2B continues in the takeover state in operation 855.

After continuing in the takeover state in operation 855, the node 2B receives a cluster failover giveback issued by the user or automatically using an auto-giveback operation, operation 856. A giveback request needs to be initiated by the user or through auto-giveback processing, where the node recognizes that the down partner has rebooted and is ready to resume service of data. After in the takeover operation 855, the node 2B, determines whether it can receive the state information from the node 2A, operation 857. If the node 2B cannot receive the state information from the node 2A in operation 857, the node 2B may display a message to the user, allowing a cluster failover giveback override to be issued by the user, operation 858, and continues in the takeover state 855. The override in operation 858 allows a user to continue with the giveback process even if the firmware state of the partner is unknown. However, if the node 2B can receive the state information from the node 2A in operation 857, the node 2B determines if the node 2A is in the second wait state, waiting for the node 2B to update the contents of the mailbox disks 410, operation 859. If the node 2B determines that the node 2A is not in the second wait state, the node 2B may display the message, and require that the user issue the cluster failover giveback command in operation 858. However, if the node 2B determines that the node 2A is in the second wait state, the node 2B performs the giveback functions, updates the mailbox disks 410, changes the state information from the takeover state to the normal state, and sends the updated state information over the cluster interconnect 5 to the node 2A, operation 860.

In another embodiment, the method 800 of operating the node 2B in a cluster configuration is configured to prevent the node 2A from accessing and serving data from the taken-over storage devices 4A when the node 2A is taken over by the node 2B, while allowing release of the disk reservations on the storage devices 4A before control is given back to the node 2A (e.g., early release of disk reservations). In preventing the node 2A from accessing and serving data, the method may further include preventing the node 2A from booting to a point at which the node 2A serves data from the storage devices 4A. The operation of preventing the node 2A from booting may include taking over the node 2A by the node 2B, notifying the node 2A that it has been taken over using the state information of the node 2B, and giving back control to the node 2A of the storage devices 4A associated with the node 2A. The operation of notifying the node 2A that it has been taken over may include sending to the node 2A a takeover state signal representative of the takeover state of the node 2B. This may be done as a fencing mechanism to prevent the node 2A from accessing and serving data at the same time as the node 2B (e.g., split-brain conflict). This fencing mechanism may be implemented in addition to other types of fencing mechanisms, such as placing disk reservations on the storage devices 4A, and writing the takeover state and cluster information in the mailbox disks 410 of the storage devices 4A.

It should be noted that although some of the embodiments above have been described as storage servers in a storage server cluster, the embodiments may also be implemented in other types of cluster configurations. For example, the nodes 2A and 2B may be client-based servers that service requests from clients 1. The primary purpose of these client-based servers may not be to service data storage requests for data storage on the storage devices 4A and 4B, but may include other types of processing requests for the clients 1. The client-based servers may be coupled to associated resources that are used in servicing the requests from the clients 1. In these embodiments, the takeover state information is received by the taken-over node on the interconnect 5, as described above, and the takeover state information can be written to an on-disk area known to the clustering code in a storage device associated with the failed node. The on-disk area may be a disk containing the cluster information that is coupled to the node. Alternatively, the on-disk area may be other storage devices known to those of ordinary skill in the art. In the embodiment of two client-based servers, the on-disk area that includes the clustering information may be stored in memory that resides internally or externally with respect to the client-based servers. The contents of the memory, like the mailbox disks 410, indicate to the partner node that has failed that it has been taken over.

In another embodiment, the method of operating the node 2A in a cluster configuration is configured to initialize a boot process of a server, such as a client-based server, and to prevent the client-based server 2A from continuing to boot as part of the boot process in response to response to receiving data that indicates that the server is in a taken-over state by a cluster partner. This data can be received from the cluster partner, or alternatively, from a third node, such as a third server, a management console, or other nodes known by those of ordinary skill in the art. After the server has been prevented from continuing to boot, the server 2A receives control of taken-over resources associated with the server 2A from the cluster partner, server 2B, and continues to boot in response to receiving the control of the taken-over resources back from the server 2B. In another embodiment, before the server 2A receives control of taken-over storage devices associated with the server 2A from the cluster partner, server 2B, since the server 2A has received takeover state information, disk reservations of taken-over storage devices associated with the server can be released before receiving control of the taken-over storage devices from the cluster partner. This release of reservations are considered to be an early release of reservations that allow the server 2A to access the associated storage servers before control has been given back from the server 2B. Receiving data at the server 2A to indicate that it has been taken-over in preventing the server 2A from continuing to boot is considered a fencing mechanism to prevent the node 2A from accessing and serving data at the same time as the node 2B (e.g., split-brain conflict). This fencing mechanism may be implemented in addition to other types of fencing mechanisms, such as placing disk reservations on associated storage devices or on other associated resources, and writing the takeover state and cluster information in on-disk area that contains the cluster and takeover state information (e.g., mailbox disks 410).

Embodiments of the present invention include various operations, as described above. These operations may be performed by hardware components, software, firmware, or a combination thereof. The various operations may be performed by executing one or more computer programs to perform functions of the embodiments by operating on input data and generating output data. The various operations may also be implemented in, for example, special purpose logic circuitry, e.g., a field programmable gate array (FPGA), digital signal processor (DSP), Application-specific integrated circuit (ASIC), programmable logic device (PLD), or the like). Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as one or more computer program products. The one or more computer programs may be tangibly embodied in an information carrier, e.g., in a machine-readable storage device or in a propagated signal, for execution by, or to control the operation of, one or more general-purpose or special-purpose processors to perform the described operations. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM disks); digital video disk (DVD) ROM disks, magneto-optical storage medium; read-only memory (ROM); random-access memory (RAM); erasable programmable memory (e.g., EPROM and EEPROM); flash memory; electrical, optical, acoustical, or other form of propagated signal (e.g., carrier waves, infrared signals, digital signals, etc.); or another type of medium suitable for storing electronic instructions.

Additionally, some embodiments may be practiced in distributed computing environments where the machine-readable medium is stored on and/or executed by more than one computer system. In addition, the information transferred between computer systems may either be pulled or pushed across the communication medium connecting the computer systems.

The processing device(s) described herein may include one or more general-purpose processing devices such as a microprocessor or central processing unit, a controller, or the like. Alternatively, the digital processing device may include one or more special-purpose processing devices such as a DSP, an ASIC, an FPGA or the like. In an alternative embodiment, for example, the digital processing device may be a network processor having multiple processors including a core unit and multiple microengines. Additionally, the digital processing device may include any combination of general-purpose processing device(s) and special-purpose processing device(s).

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense

What is claimed is:

1. A method comprising:
operating a storage server in a storage server cluster; and
preventing a cluster partner in the storage server cluster from accessing and serving data from taken-over storage devices associated with the cluster partner when the cluster partner is taken over by the storage server while allowing early release of reservations on the taken-over storage devices associated with the cluster partner before control is given back to the cluster partner,
wherein said preventing comprises sending a takeover state signal representative of the takeover state of the storage server to notify the cluster partner that the cluster partner has been taken over,
wherein the takeover state signal stops the cluster partner from serving the data when the cluster partner does not discover contents of a clustering disk area including clustering information and takeover state information stored on the taken-over storage devices,
wherein the storage server and cluster partner are each physically connected to the taken-over storage devices and the reservations are configured to indicate that the storage server owns the control of the taken-over storage devices until the release of the reservations.

2. The method of claim 1, wherein preventing the cluster partner from booting further comprises: taking over the control of the taken-over storage devices associated with the cluster partner by the storage server; and notifying the cluster partner that the cluster partner has been taken over, wherein notifying the cluster partner comprises sending the takeover state signal representative of the takeover state of the storage server over a cluster interconnect between the storage server and the cluster partner.

3. The method of claim 1, further comprising:
releasing the reservations on the taken-over storage devices associated with the cluster partner early; and
giving back the control of the taken-over storage devices to the cluster partner, wherein the reservations are released before said giving back the control to the cluster partner.

4. A method comprising:
initializing a boot process of a storage server in a failover or reboot context;
discovering disk reservations on an array of storage devices, the disk reservations are configured to indicate that a cluster partner owns the control of the array of storage devices until the release of the reservations;
in response to the cluster partner releasing the disk reservations early, searching for contents of a clustering disk area including clustering information and takeover state information;
receiving, at the storage server, takeover data to indicate that the storage server is in a taken-over state; and
determining that the storage server has been taken over by the cluster partner using the contents of the clustering disk area when discovered; and
determining that the storage server has been taken over by the cluster partner using the received takeover data when the contents of the clustering disk area are not discovered, wherein said determining stops the storage server from serving the data from the array of storage devices taken over by the cluster partner while allowing the early release of disk reservations before control is given back to the storage server.

5. The method of claim 4, wherein said receiving takeover data comprises receiving, at the storage server, the takeover data from the cluster partner.

6. The method of claim 4, wherein said receiving takeover data comprises receiving, at the storage server, the takeover data from an external node.

7. The method of claim 6, wherein the external node is at least one of a third storage server coupled to the storage server, or a management console.

8. A system, comprising:
a first storage server physically coupled to communicate with a first array of storage devices and a client; and
a second storage server coupled to the first storage server by a cluster interconnect, wherein the second storage server is physically coupled to communicate with a second array of storage devices and is physically coupled to the first array of storage devices associated with the first storage server, wherein the first storage server is configured to:
initialize a boot process in a failover or reboot context;
discover disk reservations on the first array of storage devices, the disk reservations are configured to indicate that the second server owns the control of the first array of storage devices until the release of the reservations;
in response to the second storage server releasing the disk reservations early, search for contents of a clustering disk area including clustering information and takeover state information;
receive takeover data to indicate that the first storage server is in a taken-over state;
determine that the first storage server is in a taken-over state by the second storage server using the contents of the clustering disk area when discovered; and
determine that the first storage server is in the taken-over state by the second storage server using the received takeover data when the contents of the clustering disk area are not discovered, wherein the takeover data is configured to stop the first storage server from serving the data from the first array storage taken over by the second storage server while allowing the early release of disk reservations before control is given back to the first storage server.

9. The system of claim 8, wherein the first storage server is configured to receive the takeover data from an external device, and wherein the first storage server is configured to determine that the first storage is in the taken-over state using the received data from the external device.

10. The system of claim 9, wherein the external device is at least one of the second storage server, a third storage server coupled to the first storage server, or a management console.

11. A server, comprising:
a processor;
a communication interface through which to communicate with a client of the server;
a second communication interface through which to communicate with taken-over storage devices associated with a cluster partner;
a cluster interconnect adapter to enable the server to communicate with the cluster partner over a cluster interconnect; and
a memory storing instructions which configure the processor to put the server in a takeover state when the cluster partner has failed and to prevent the cluster partner from booting to a point at which the cluster partner serves data, by sending takeover data to the cluster partner to indicate that the server is in the takeover state, and wherein the instructions further configure the processor to allow early release of reservations on the taken-over storage devices associated with the cluster partner before control is given back to the cluster partner, wherein the server and cluster partner are each physically connected to the taken-over-storage devices and the reservations are configured to indicate that the server owns the control of the taken-over storage devices until the release of the reservations, and wherein the takeover data stops the cluster partner from serving the data when the cluster partner does not discover contents of a clustering disk area including clustering information and takeover state information.

12. The server of claim 11, wherein preventing the cluster partner from booting comprises:
taking over the control of the taken-over storage devices associated with the cluster partner by the server; and
notifying the cluster partner that the cluster partner has been taken over, wherein notifying the cluster partner comprises sending the takeover data representative of the takeover state of the storage server over the cluster interconnection between the server and the cluster partner.

13. The method of claim 12, further comprising:
releasing the reservations on the taken-over storage devices associated with the cluster partner early; and
giving back the control of the taken-over storage devices to the cluster partner, wherein the reservations are released before said giving back the control to the cluster partner.

14. A server, comprising:
a processor;
a network adapter coupled to the processor, through which to receive client requests from a client over a network;
a cluster interconnect adapter to enable the server to communicate with a cluster partner; and
a memory storing instructions which configure the processor to respond to receiving takeover data indicating that the server is in a taken-over state to prevent the server from booting to a point at which the server services the client requests in a failover or reboot context, wherein the instructions further configure the processor to initialize a boot process in a failover or reboot context, to discover disk reservations on taken-over resources associated with the server, wherein the reservations are configured to indicate that the server owns the control of the taken-over resources until the release of the reservations, and wherein the instructions further configure the processor to receive the control of the taken-over resources from the cluster partner after the release of reservations, to search for contents of a clustering disk area including clustering information and takeover state information, to determine that the storage server has been taken over by the cluster partner using the contents of the clustering disk area when discovered and using the received takeover data when the contents of the clustering disk area are not discovered, and to continue to boot as part of the boot process in response to receiving the control of the taken-over resources without user intervention at the server.

15. The server of claim 14, wherein receiving data comprises receiving the takeover data from the cluster partner, a third server, or a management console.

16. A method, comprising:

initializing a boot process of a server;

discovering disk reservations on taken-over resources associated with the server, wherein the disk reservations are configured to indicate that the server owns the control of the taken-over resources until the release of the reservations;

receiving, at the server, takeover data to indicate that the server is in a taken-over state by the cluster partner;

searching for contents of a clustering disk area including clustering information and takeover state information;

determining that the server is in the taken-over state by the cluster partner using the contents of the clustering disk area when discovered;

determining that the server is in the taken-over state by the cluster partner using the received takeover data when the contents of the clustering disk area are not discovered;

preventing the server from continuing to boot as part of the boot process in response to determining that the server is in the taken-over state;

receiving the control of the taken-over resources associated with the server from the cluster partner; and continuing to boot as part of the boot process in response to receiving the control of the taken-over resources without user intervention at the server.

17. The method of claim 16, wherein receiving the takeover data comprises receiving the takeover data from the cluster partner.

18. The method of claim 16, wherein receiving the takeover data comprises receiving the takeover data from a third node.

* * * * *